March 31, 1953 L. W. STORM 2,633,333
PIPE SPINNER
Filed May 17, 1948 8 Sheets-Sheet 1

Fig. 1

INVENTOR.
Lynn W. Storm
BY Lester B Clark
& Ray L Smith
ATTORNEYS.

L. W. STORM 2,633,333

PIPE SPINNER

Filed May 17, 1948

Inventor
Lynn W. Storm

By Lester B Clark
& Ray L. Smith
ATTORNEYS.

March 31, 1953 L. W. STORM 2,633,333
PIPE SPINNER

Filed May 17, 1948 8 Sheets-Sheet 5

INVENTOR.
Lynn W. Storm
BY Lester B Clark
Ray L Smith
ATTORNEYS

March 31, 1953　　　　L. W. STORM　　　　2,633,333
PIPE SPINNER

Filed May 17, 1948　　　　　　　　　　　　8 Sheets-Sheet 6

Inventor
Lynn W. Storm

Lester B Clark
& Ray L Smith
ATTORNEYS.

March 31, 1953 L. W. STORM 2,633,333
PIPE SPINNER

Filed May 17, 1948 8 Sheets-Sheet 7

Inventor
Lynn W. Storm

By Lester B Clark
& Ray L Smith
ATTORNEYS.

March 31, 1953  L. W. STORM  2,633,333
PIPE SPINNER

Filed May 17, 1948  8 Sheets-Sheet 8

Inventor
Lynn W. Storm

By Lester B Clark
 & Ray L Smith
ATTORNEYS

Patented Mar. 31, 1953

2,633,333

UNITED STATES PATENT OFFICE 2,633,333

PIPE SPINNER

Lynn W. Storm, Houston, Tex.

Application May 17, 1948, Serial No. 27,554

3 Claims. (Cl. 255—19)

This invention relates to a method or system of handling pipe, especially drill pipe used in the rotary method of drilling oil wells; such system being especially adapted to combine the use of several new items of pipe handling equipment in a manner to speed up the time required "to make trips" with pipe into and out of the well, while at the same time greatly minimizing the hazards to personnel and the breakage of equipment now encountered with present conventional apparatus.

It is an object of this invention to provide an electrically actuated pipe spinner to accomplish the functions of the spinning chain now presently used and actuated by draw works in making trips into and out of the well.

It is also an object of this invention to provide a pipe spinner of this class, which also eliminates the conventional elevators used in lifting conventionally jointed drill pipe from a well.

It is a further object of this invention to provide a pipe spinner of this class which eliminates the use of the lift plugs presently required in elevating flush joint drill pipe from a well.

It is also an object of this invention to eliminate the use of the spinning chain, while going into the well, by using a centering tool, releasable clamp, and auxiliary power hoist at the "monkey board" level of the derrick, to position stands of pipe so that a pipe spinner of the class described may spin the stands into the top boxes of pipe strings when they are gripped by the slips of the rotary table at the top of a well.

It is a further object of this invention to provide a centering tool at the monkey board level of the derrick to facilitate the handling of racked pipe when both "going into" and "coming out of" a well.

Another object of this invention is to provide an adapter receivable in the square of the rotary table for supporting the top joints of conventionally jointed pipes and eliminating the use of slips for this purpose when both going into and coming out of a well.

It is a further object of this invention to provide an adapter of this class to be provided with dogs to prevent the transverse scoring of the pipe during handling.

It is also an object of this invention to adapt the pipe spinner for use with a modification of the presently used elevators now conventionally employed in going into the well, and with this adaptation the spinning chain operation is eliminated.

It is a further object of this invention to adapt the pipe spinner for use with a modification of the presently used elevators now conventionally employed in making trips into the well, and with such adaptation the necessity of rotating the pipe by the rotary table is eliminated.

It is a further object of this invention to provide a method of using the pipe spinner with modifications of conventionally used elevator equipment in both going into and coming out of the well.

Other and further objects of this invention will be more fully apparent when the following description is taken in connection with the accompanying drawings, in which.

Figure 1:
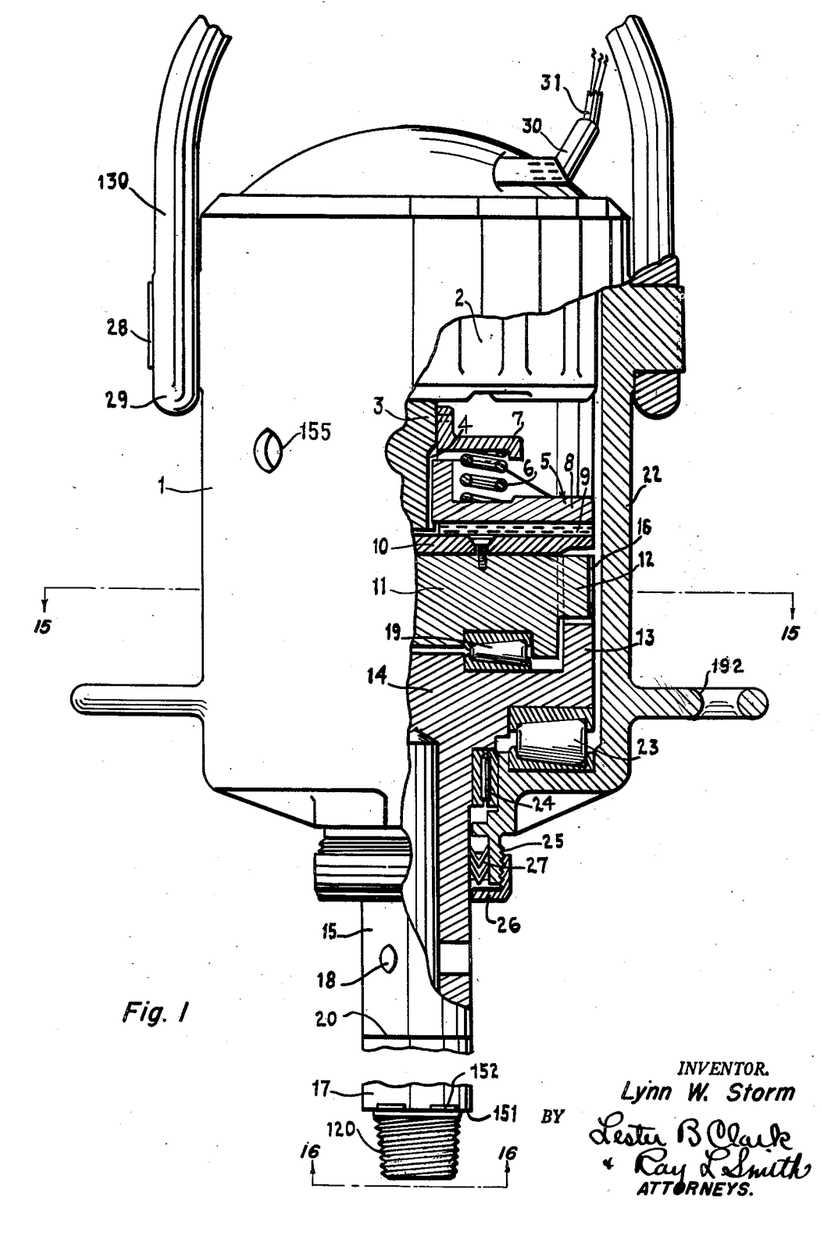
Fig. 1 is an elevation, part in section, of the pipe spinner.
Figure 2:
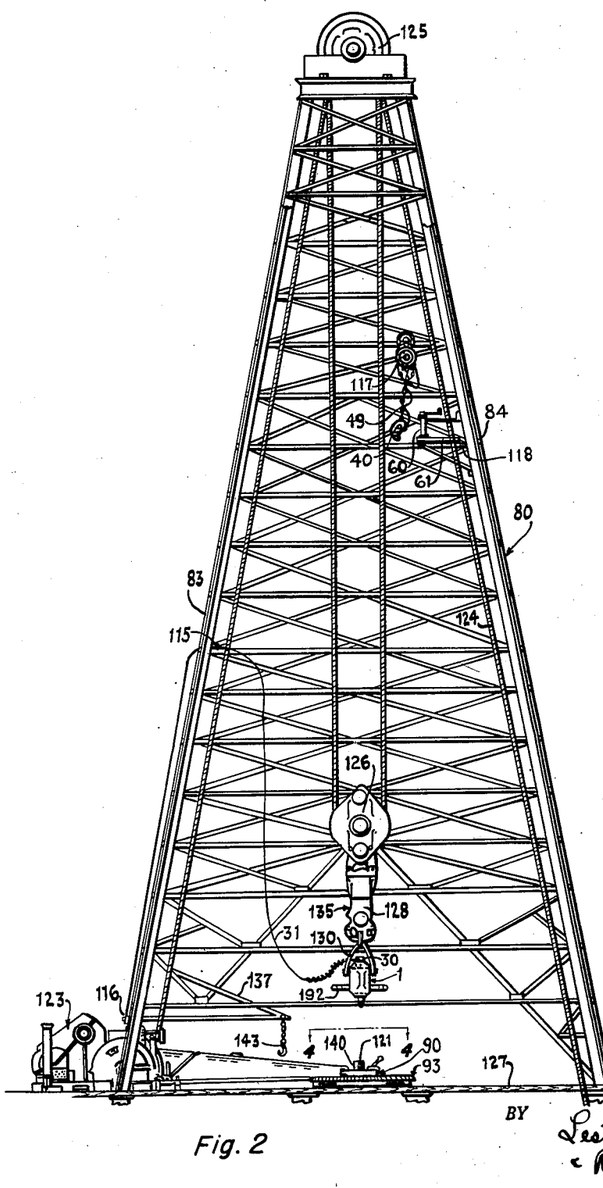
Fig. 2 is an elevation of the derrick with the equipment of this invention installed thereon, which shows the pipe spinner being lowered to be spun into the box of the top joint of the drill string when such top joint is positioned to extend above the rotary table.
Figure 3:
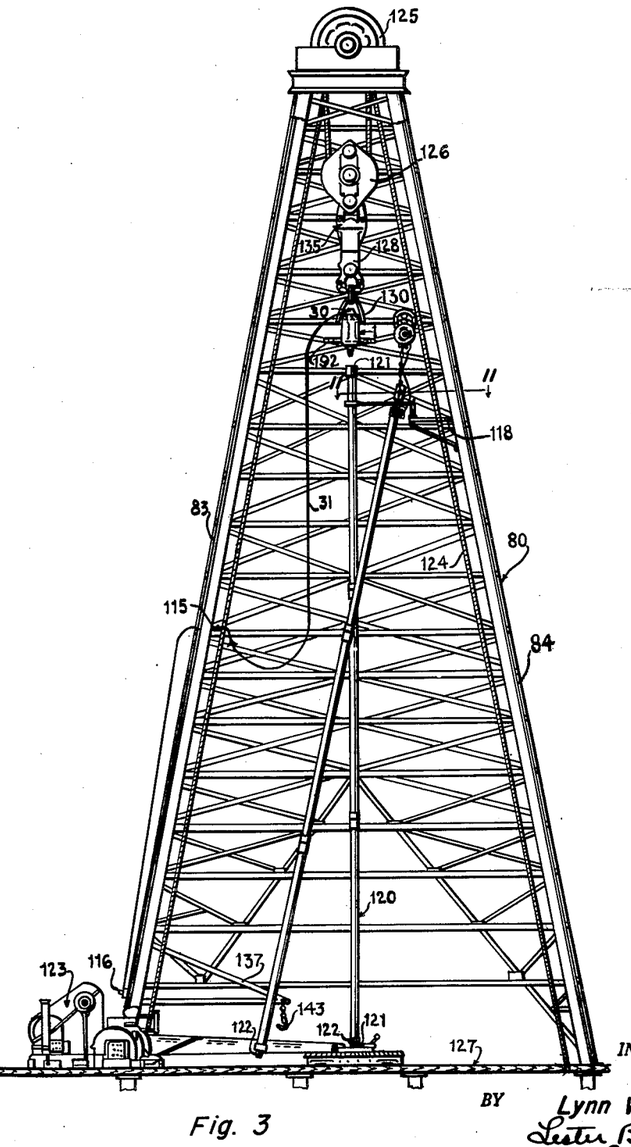
Fig. 3 is an elevation showing a derrick with the equipment of this invention installed thereon and being used to handle racked pipe in the process of going into a well.

The pipe spinner 1, shown in Fig. 1, has therein a motor 2 which has a driving shaft 3 connected by a key 4 to drive a friction clutch 5. The friction clutch 5 has a disc 8 faced with any well known friction material 9, and this is urged against the face 10 of the lost motion coupling 11 by means of the spring 6, which exerts pressure between the flange 7, rigidly fixed to the shaft 3, and the friction disc 8 of the friction clutch 5; the disc 8 having its surface faced with any well known friction material 9.

Figure 15:
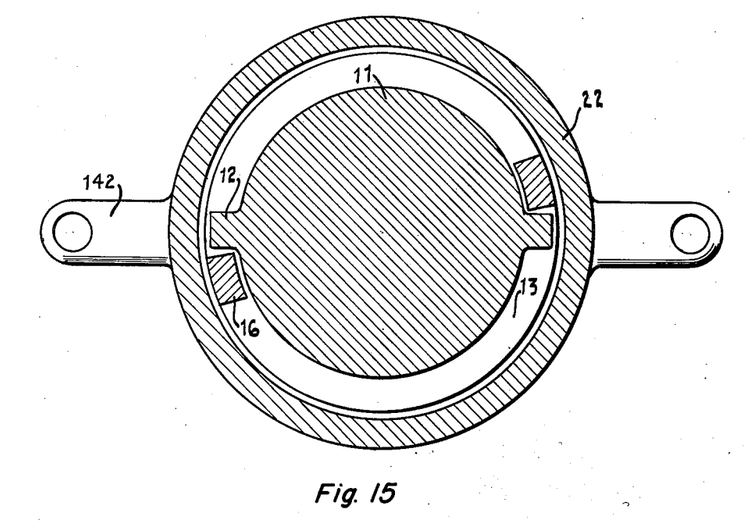
Fig. 15 is a sectional plan view through the pipe spinner taken along line 15—15 of Fig. 1.

The adjacent element against which the friction material is urged comprises the friction face 10, which is rigidly fixed to the coupling 11, so that the rotary frictional contact of the friction material 9 against this face transfers rotation to the positive clutch. This positive clutch has spaced ears 12 thereon, as shown in Fig. 15, which are adapted to be rotated into contact with spaced lugs 16 on the inner end or hub 13 of the clutch driven shaft 14.

The provision of both the friction clutch 5 and the lost motion coupling 11 insures that the pin 17 may be broken out of the box 121 of a pipe section after it has been threaded thereinto and shouldered up tightly thereon. When the motor is reversed for this purpose, the ears 12 of the coupling 11 will be rotated into forcible contact with the lugs 16 of the shaft 14, so as to more readily break loose the engagement of the pin 17 in the box 121 of the pipe section. At the same time the impact of the ears 12 on the lugs 16 will not be transmitted to the motor 2, but will be absorbed by the friction created between the friction face 10 and the friction material 9.

The clutch driven shaft is shown as having a hollow extension 15 onto which is fixed at the end thereof the pin 17, which is threaded externally, as will be hereinafter described. Radial drain openings 18 are provided in the hollow extension 15, to provide air escape from the drill pipe.

Tapered roller bearings 19 are provided between the positive clutch 11 and the inner end 13 of the shaft 14. The motor, clutches, and the inner end of the shaft 14 are all enclosed in a housing 22, and a tapered roller bearing unit 23 is interposed between the inner end 13 and the housing 22, while a roller bearing unit 24 is interposed between the housing 22 and the hollow extension 15 of the shaft 14.

The housing has a threaded end 25 over which is fitted a cap 26 to enclose a seal 27, so that the housing interior may be grease packed for lubrication through the grease opening 155. Bosses or ears 28 are provided on the housing about which fit the machined rings 29 of the bail 130, the bail 130 being adapted at its upper end, not shown, for suspension, as from the hook of a hoisting assembly. An electrical conduit 30 is shown extending from the motor to the housing exterior, so that an electrical power lead 31 may be passed therethrough to convey electrical power to the motor.

The pins 17 are of various sizes to conform to the various diameters of pipe being handled, and are connected by threads, not shown, to the hollow extension 15, as at 20. The threads 120 of the pins 17 are turned down to undersized dimensions to fit loosely in a pipe box so that when the spinning elevator is rotated in a left-handed direction to disengage the pin from the box of drill pipe in which it may have been inserted, there is assurance that the joint between the pin and top box of drill pipe will be broken rather than some lower joint in the drill string assembly.

Figure 16:
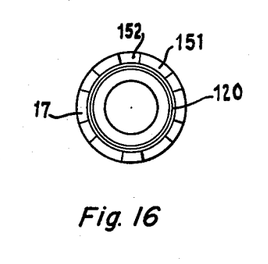
Fig. 16 is a bottom view of the pipe spinner pin, taken along line 16—16 of Fig. 1.

This result is further assured by the fact that the contact face 151 of the pin 17 is relieved or beveled at radially spaced intervals 152 to insure that there is less contact surface between the pin face and box face than there is contact surface between faces of the other joints of the drill string assembly.

Figure 4:
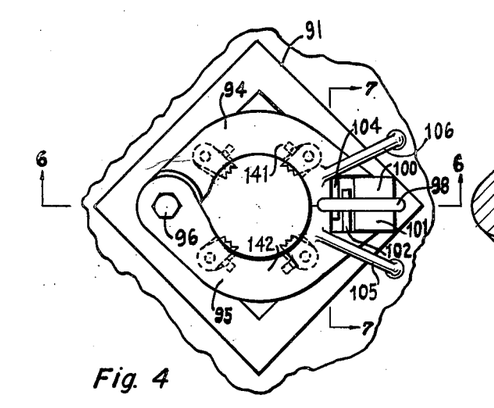
Fig. 4 is a plan view of the adapter used in connection with conventionally jointed pipe, taken along line 4—4, of Fig. 2.
Figure 5:
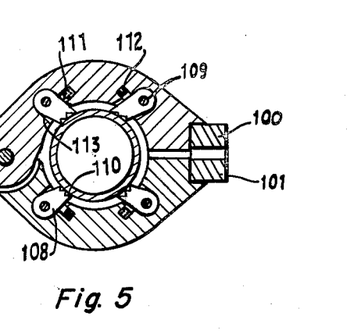
Fig. 5 is a sectional plan view of the adapter taken along line 5—5 of Fig. 6.

An adapter 90, shown in Figs. 4, 5, 6, and 7, is provided for employing the method of this invention with conventionally jointed pipe, and this adapter is insertable in the square 91 of the bushing 92 of the rotary table 93. This adapter has arms 94 and 95, which are pivotal about the pin 96 which is threaded into, and extends above, the adapter body 97. The arms 94 and 95 have together a substantially cylindrical internal face configuration, as shown in Figs. 4 and 5.

A latch 98 is pivoted on a pin 99 mounted between two projections 100 and 101 of adapter body 97. The arm 95 has a lug 102 thereon which has notch 103 to receive the latch 98. The arm 94 also has a lug 104 thereon which has a notch 103 to receive the latch 98. When the arms 94 and 95 are pivoted about pin 96 and brought together, as shown in Figs. 4 and 5, and when the latch 98 is pivoted about the pin 99 to fall into the notches 103 of the lugs 102 and 104, the arms are locked together. Handles 105 and 106 are provided on the arms to facilitate this latching operation and the latch 98 has a handle grip 107 formed therein to facilitate the manual swinging of the latch.

As shown in Fig. 5, dogs 108 are pivoted on vertical pins 109 within the arms 94 and 95, and these dogs are designed so that the teeth 110 thereof may be forced into gripping contact with drill string pipe in the rotary table by means of the pins 111, which operate in the spring loaded holes 112. It should be noted that the dogs 108 face alternately in the slots 113, and are urged alternately by the springs in opposite directions, so that the dog teeth 110 may bind the pipe against rotation in both clockwise and counter-clockwise directions.

It should be pointed out that whereas the arms are opened and closed by the manual operation of the handles 105 and 106 and the latch 98, the structure of this adapter is not limited to such devices, and the latch may be foot actuated by any well known means, and the arms may also be opened by a foot actuated device, or by other means, such as by spring actuation.

Figure 8:
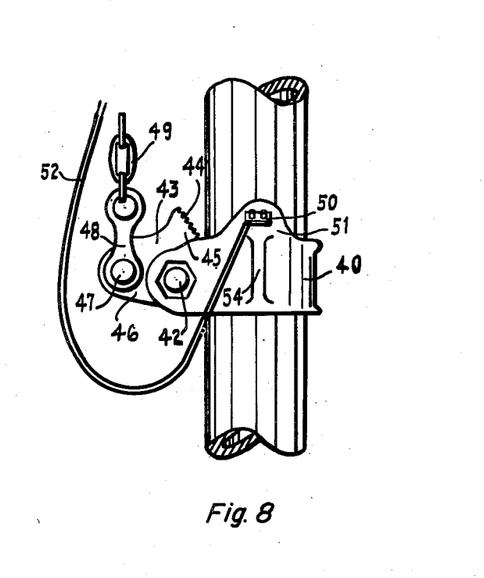
Fig. 8 is an elevation of the releasable clamp when it has just been released from the pipe, taken along line 8—8 of Fig. 10.
Figure 9:
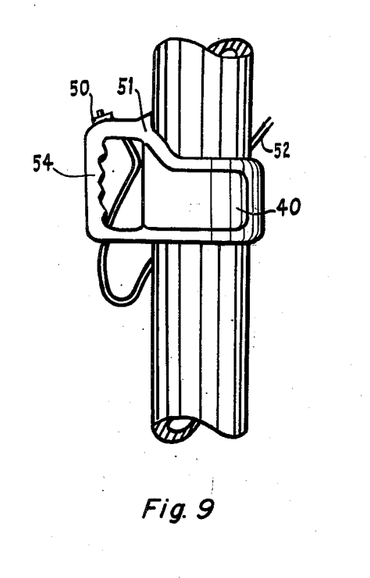
Fig. 9 is an elevation of the releasable clamp in pipe gripping position, taken along line 9—9 of Fig. 10.
Figure 10:
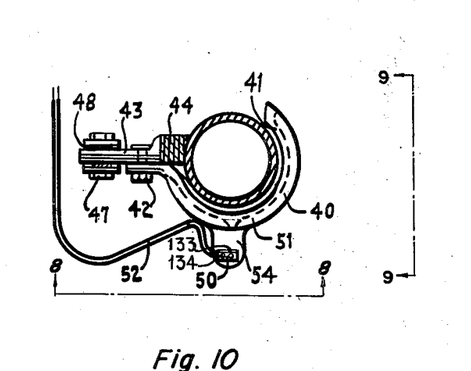
Fig. 10 is a plan view of the releasable clamp.

A releasable clamp is shown in Figs. 8, 9, and 10, which includes clamp body 40, which has a serrated inner face 41 for better grasping the pipe. The jaw 43 is pivotally connected to this clamp body 40 by means of the bolt 42. This jaw 43 has teeth 44 on the inner face 45 thereof and the pin 47 passes through the outer end 46 thereof to receive the terminal link 48 of the chain 49 which extends up to an auxiliary power hoist, not shown. A conventional reversible push button switch 50 is rigidly fixed to the side 51 of the clamp 40, and the electrical connection 52 extends from this switch to the auxiliary power hoist. The side 51 has finger grip 54 thereon to better facilitate handling by the derrick man.

Figs. 11, 12, 13, and 14 show the pipe centering tool 60 which is mounted on the monkey board 61 of the derrick 80 by means of bolts 63 which pass through the bracket or brace 64 to connect this element rigidly to the monkey board floor. A braced pedestal 65 extends upwardly from the bracket 64, and the swinging arm 66 of the centering tool is mounted on top of this pedestal 65 so as to pivot thereabout within the limits of the slot 68 formed therein, the faces 69 of the slot 68 contacting the pin 55 in the pedestal 65 at either end of angular travel.

Figure 11:
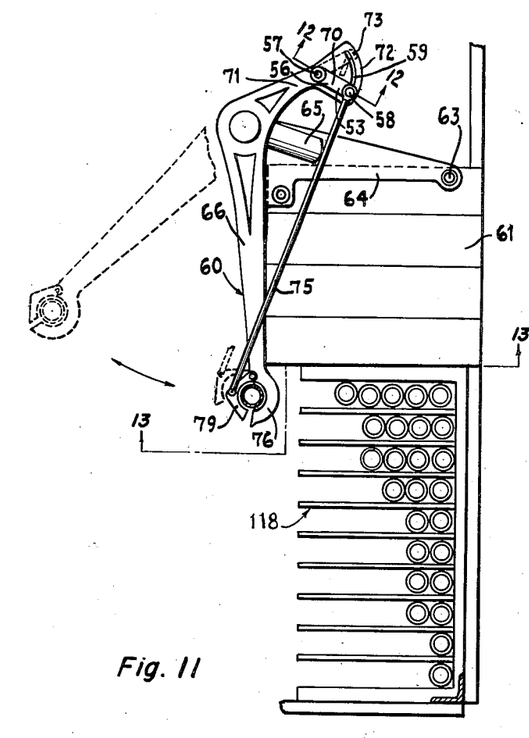
Fig. 11 is a plan view of the centering tool when mounted on the monkey board, taken along line 11—11 of Fig. 3.
Figure 12:
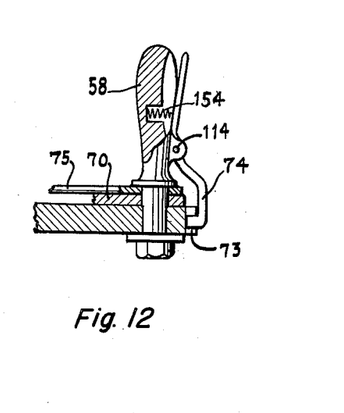
Fig. 12 is a sectional elevation showing the operating handle of the centering tool taken along line 12—12 of Fig. 11.
Figure 13:
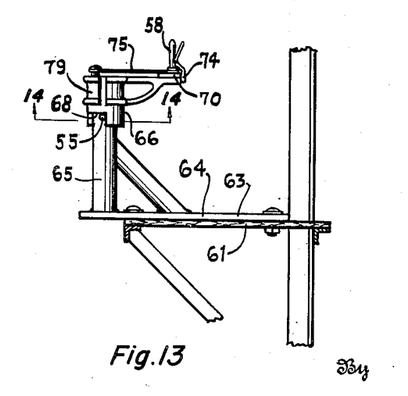
Fig. 13 is an elevation showing details of the centering tool construction, taken along line 13—13 of Fig. 11.
Figure 14:
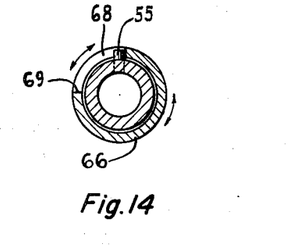
Fig. 14 is a bottom sectional view showing the stopping details of the pedestal and swinging arm, taken along line 14—14 of Fig. 13.

An end 56 of a link 70 is pivotally connected to the extension 71 of the swinging arm 66, as by the bolt 57, and the other end 53 of the link 70 has handle 58 passed therethrough to slide in slot 59 of the extension 71. The extension face 72 has notches 73 therein to receive the latch 74 at either end of angular travel of the swinging arm 66. The latch 74 is pivotally connected at 114 to the handle 58 and is forced outwardly by spring 154 which is recessed in the handle.

A rod 75 is pivotally connected to the handle 58 above the link 70 and at its other end this rod 75 is pivotally connected to a finger 79, which in turn is pivotally connected to the swinging arm 66. The swinging arm 66 has a relieved end 76 to receive part of a pipe periphery and the finger 79 is of such a configuration as to complement the relieved end 76 when the rod 75 has pushed the finger into the position shown in Fig. 11, so that the finger 79 and the end 76 may substantially encircle a pipe.

The various devices of this invention are installed for operation on the conventional oil field drilling rig in the following manner:

A lead 31 from any conventional source of electrical power is taken from double throw switch 116, up leg 83 of the derrick 80 and anchored at a point 115 at an elevation above the derrick floor equal to approximately half the length of a stand of pipe, such a stand usually consisting of three pipe sections. Then the lead 31, extending further to a length slightly longer than the elevation of the point 115 above the derrick floor, is connected at conduit 30 to the pipe spinner 1, as shown in Fig. 1. The two pole switch 116 is installed on the derrick leg 83 for easy access by the driller who also operates the draw works 123 of the rig.

Rings 192 are formed integrally with the elevator 1 so that the hook 143, which is suspended from a beam 137, rigidly connected to the derrick leg 83, may be hooked into one of the rings to prevent counter-rotation of the housing as a result of reaction torque, which is built up when the spinning elevator is rotated in a left-handed direction to unthread the pin 17 from the box 121 of a pipe joint 140.

The centering tool 60 is installed on the monkey board 61, which is located on side 84 of the derrick at an elevation slightly less than the elevation of one stand of pipe above the top of the rotary table 93.

An auxiliary power hoist 117 is located on the derrick slightly above the monkey board 61, and the releasable clamp 40 is suspended therefrom by the chain 49.

The adapter 90, for use in handling conventionally jointed pipe, is kept at a suitable place on the derrick floor to be used when needed.

Figures 17, 18, 19:
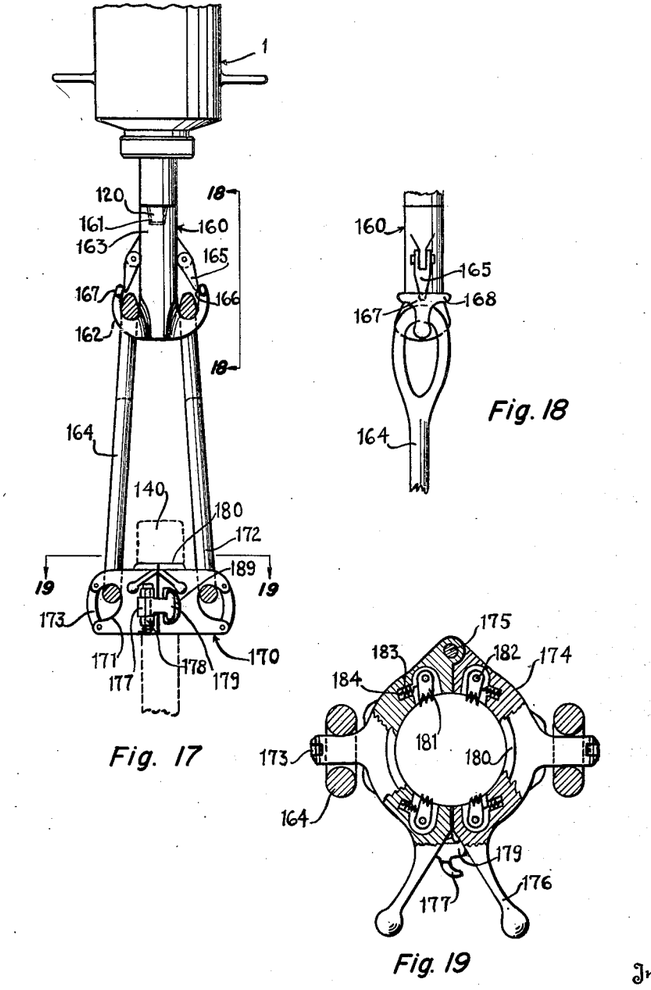
Fig. 17 is an elevation of the pipe spinner when employed with modified design of presently used elevators.
Fig. 18 is a partial side view, taken along line 18—18 of Fig. 17.
Fig. 19 is a plan view, part in section, taken along line 19—19 of Fig. 17.

The spinning elevator 1 may also be adapted for use with a modification of conventional pipe elevators as shown in Figs. 17, 18, and 19. To make this adaptation, a connection hook 160 is threaded at 161 to receive the pin 17 of the pipe spinner 1. This connection hook 160 has hook arms 162 thereon oppositely opposed and integrally connected to the body 163 of the connecting hook to receive bails 164, corresponding to the conventional pipe elevator bails. Latches 165 are provided, to be forced outwardly by any conventional means, as a torsion spring, not shown, to latch against the inner edges 166 of the upper arms 167 to insure that the bails will be maintained within the connection hook 160 under all conditions. The configuration of the upper arms 167 is shown as having outwardly extending flanges 168 designed to bind against the bails 164 to counteract the tendency of the bails to rotate but at the same time to permit limited movement thereof when the modified elevator 170, to be hereinafter described, is opened.

A modified elevator 170 is shown as having recesses or notches 171 therein to receive the lower bail portions 172, and latches 173 of any conventional design are provided on the modified elevator 170 to latch the bails 164 within the recesses 171 and to prevent the bails from rotating.

The modified elevator 170 is shown composed of two arms 174 pivotal about the pin 175, and these arms are provided with handles 176 to permit the manual opening of the arms.

A latch 177 is shown provided, which can be pivoted around a pin 178 in one arm so that the latching face 179 may be forced by spring means, not shown, into latching contact in a recess 189 formed in the outer surface of the other arm 174. A face or boss 180 is formed on the upper side of the arm 174 so as to receive and support pipe joints 140 of conventional pipe.

Dogs 181 are shown pivotal about pins 182 within the arms 174, and are forced by springs 183 based in recesses 184, in directions to bind the pipe against rotation in either clockwise or counter-clockwise direction.

The operation of "making a trip into a well" is carried out after all the pipe has been pulled out of the well, usually in stands of three pipe sections at a time, and has been racked with the lower ends of the stands resting on the derrick floor 127 and the upper ends of the stands leaning against the side of the derrick in the rack 118 at slightly above the monkey board level. Such operation is usually carried out in order to change the bit which has become dull in drilling, or for any number of other purposes. Then it becomes necessary to lower the drill bit and the drill collar to which the bit is attached, back to the bottom of the well to recommence drilling.

The operation of "coming out" of a well is conducted when it is necessary to pull all of the pipe out of the well, one stand at a time, and rack it so as to replace a bit, or for a number of other purposes. The conventional drill pipe 120 used in wells comprises joints of pipe enlarged at one end thereof to form an internally threaded box 121 for receiving the externally threaded lower end or pin 122 of an adjacent pipe section. Alternately drill pipe may be of the flush joint type in which the internally threaded box at the end of a pipe section is of the same outer diameter as the remainder of the section.

The operations to which the equipment of this system are adapted comprise "going into" a well with flush joint pipe; "going into" a well with conventionally jointed pipe; "coming out" of a well with flush joint pipe; and "coming out" of a well with conventionally jointed pipe. These types of operations will be respectively described herein:

"Going into" a well with flush joint pipe

This operation commences with the drill collar or pipe 120 having been positioned in conventional slips in the rotary table 93 by any conventional manner so that the top of the drill collar extends slightly above the top of the table. The "Kelly" joint, used in drilling, and the swivel above it, to which the top of the "Kelly" joint is attached, have been lifted off of the hook 128 of the hoisting apparatus 135 and set aside, as in a well, extending below the derrick floor 127, and consequently this is equipment not shown.

After that the draw works 123 of the rig has been actuated to unwrap the wire rope 124 from the drum thereof, not shown. This wire rope 124 is shown as being rigged by passing it through the crown block 125 at the top of the derrick and through the block 126 of the hoisting apparatus 135, to which the hoisting hook 128 is attached. The rope 124 further extends down to the derrick floor 127 on the side of the derrick opposite the draw works, and is anchored below the derrick floor.

The draw works now lowers the block 126 and hook 128 of the hoisting apparatus 135 to a position where the pipe spinner 1 may be picked up off the derrick floor 127, and the bail 130 thereof fixed in the hoisting hook 128. Then, as the operation commences the driller is found standing by the draw works 123; the derrick man is standing on the monkey board; and the floor man, who has just finished putting the spinning elevator on the hook, is on the derrick floor 127.

The driller now actuates the draw works 123 to wind up the rope around the draw works drum and this starts the spinning elevator 1 travelling upwardly. At the same time the derrick man reaches over to the pipe rack 118 to grasp the top of a stand of pipe and places it in the centering tool 60 when this tool is in the off center position shown in Fig. 11. The derrick man then takes the releasable clamp 40, places it on this stand of pipe just below the top thereof, at an elevation slightly above the centering tool 60, and pushes the elevating button 134 on the clamp 40 to actuate the auxiliary hoist 117 to pull the chain 49 upwardly and force the teeth 44 of the clamp jaw 43 into biting and binding contact with the pipe.

The auxiliary hoist 117 further elevates the stand of pipe so that the floor man, without any lifting, may catch the lower end of the stand and walk it over to position the pin 122 of the lower pipe section in the box 121 of the drill collar or pipe 120 which extends just above the rotary table 93. After this the derrick man presses the lowering button 133 on the auxiliary hoist 117 to slacken off on the chain 49 and release the jaw 44 from contact with the pipe periphery at the top of the stand. The derrick man then grasps the clamp 40 by the grip 54, removes it from the stand, and sets it aside, as on the monkey board platform 61.

While the above described steps have been occurring the pipe spinner 1 has been gradually moving upward, and when it reaches an elevation above the top of the stand the derrick man swings the centering tool 60 outwardly to position the top of the stand in a vertical line with the bottom thereof and with the box 121 of the drill collar 120. The driller now actuates the draw works 123 to stop the upward travel of the block 126 and pipe spinner 1 and then reverses the draw works to lower the elevator slightly until the pin 17 thereof is in position in the box 121 of the top section of the stand.

The driller then closes the double throw switch on the derrick leg 83 to rotate the pipe spinner 1 in a right-handed direction to "make up" or thread the elevator pin 17 into the box 121. As the switch 116 remains closed, further right-handed rotation of the spinning elevator pin 17 threads the pin 122 of the lower section of the stand into the box 121 of the drill collar or pipe 120.

The derrick man now releases the centering tool finger 79 from around the stand and swings the centering tool 60 to the off-center position. The pipe is raised and the slips are then removed from their position within the rotary table 93 below the box 121 of the drill collar so that the weight of the pipe in the well is now transmitted through the pipe spinner 1, hook 128, and block 126 of the hoisting apparatus 135, and is carried by the crown block 125 at the top of the derrick.

The driller now actuates the draw works 123 to lower away until the top of the stand is slightly above the top of the rotary table 93, at which time the slips are re-set in the rotary table to grip the pipe.

The floor man then takes the hook 143, which is suspended from beam 137 which is fixed to the derrick, and places it in the ring 192 of the pipe spinner 1, so that counter-torque rotation of the spinning hoist housing may be prevented, and then the driller actuates the double throw switch 116 to rotate the spinning elevator in a left-hand direction to disengage it from the top of the stand.

The hook 128 has therein a spring actuated retracting device, not shown, which pulls the pipe spinner 1 upwardly after it has been unthreaded from the box 121 of the stand, and the action of this device positions the spinning elevator pin 17 above, and out of contact with, the stand.

It is pointed out that whereas the hook 143 is provided, this invention does not consider that it should be necessary to use it in every case to prevent counter-torque rotation of the pipe spinner housing 22, and especially would it be dispensed with in cases where the hoisting assembly 135 and the pipe spinner 1 suspended therefrom amount to a considerable load in opposition to the factor of counter-torque. On the other hand, this invention considers that cases may arise where some means, not shown, may have to be provided above the monkey board level so that the derrick man may anchor the pipe spinner housing 22 against counter-torque rotation when the pipe spinner 1 is rotated to unthread the pin 17 thereof from the top of a stand of very light pipe which has been elevated above the well.

"Going into" a well with conventionally jointed pipe

Figure 6:
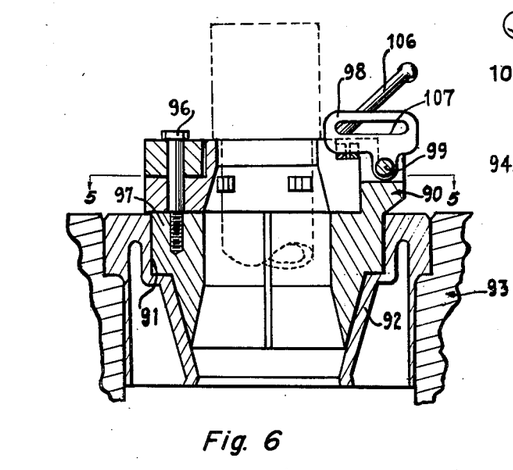
Fig. 6 is a sectional elevation of the adapter taken along line 6—6 of Fig. 4.
Figure 7:
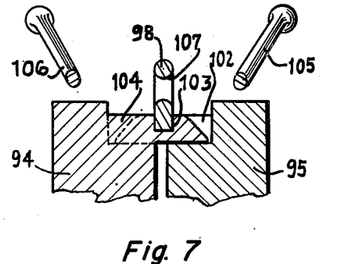
Fig. 7 is a sectional elevation of the adapter taken along line 7—7 of Fig. 4.

The operation of "going into" a well with conventionally jointed pipe commences with conditions the same as hereinbefore described for flush joint pipe, with the exception that conventional slips are not used, but instead the adapter 90 is in the square 91 of a rotary table bushing 92, so that the joint 140 of the drill collar, or of the first pipe portion 120, rests on the faces 141 and 142 of the arms 94 and 95, as shown in Fig. 6. When in this position the dogs 108 are in gripping contact with the periphery of the pipe 120 to bind it against rotation, thereby reducing the possibility of transverse scoring of the pipe.

The operation begins as has been described for flush joint pipe and follows the same sequence until after the pipe spinner has spun or threaded a stand of pipe into the box 121 of the pipe joint 140 which is positioned in the adapter 90 in the rotary table 93. The driller picks up pipe to release load on adapter 90, and the floor man then grasps the hand grip 107 of the latch 98 and rotates it outwardly about the pin 99 to unlatch the arms 94 and 95. He then grasps the handles 105 and 106 of the arms and forces them outwardly to bring the dogs 108 out of contact with the pipe 120.

Then the driller actuates the draw works 123 to lower away the pipe until the box 121 at the top of the stand is just above the rotary table 93 and then stops the draw works. The floor man then grasps the handles 105 and 106 of the adapter arms 94 and 95, and forces them inwardly to bring the dogs 108 into contact with the pipe. The floor man then throws over the latch 98 into latching position. The driller now actuates the draw works to further lower the stand, so that the top joint 140 seats on the faces of the arms 94 and 95. The driller then stops the draw works and closes the double throw switch 116 to rotate the spinning elevator to unthread the pin 17 from the joint 140, and then the driller again actuates the draw works to raise the spinning elevator, as the first step in the repeated cycle of events necessary to put another stand of pipe into the well.

*"Coming out" of a well with flush joint pipe*

When it becomes necessary to remove pipe from a well with the equipment of this invention, the "Kelly" joint and swivel are removed from the hook 128 and are set aside and the pipe spinner 1 is suspended from the hook. The first element of the drill string rests in conventional slips, not shown, in the rotary table 93, so that the box 121 at the top of the pipe 120 extends just above the table 93. It is not here stated how this first element has been positioned, but it could have been positioned with the equipment of this invention as well as with the conventional drilling equipment.

As the first step the driller actuates the draw works 123 to lower the hoisting apparatus 135 until the pin 17 of the pipe spinner 1 is in position in the box 121 of the joint 140. The driller then stops the draw works. The floor man now puts the hook 143 in a ring 192 of the pipe spinner housing 22 to prevent rotation of the housing, and then the driller closes the switch 116 to rotate the pipe spinner so that the pin 17 is threaded into the box 121 of the joint 140. After this the driller actuates the hoisting assembly to raise the pipe until the slips can be removed from the rotary table 93.

As the driller actuates the draw works 123 to raise the pipe the length of one stand, so that the top joint of a pipe section is just above the rotary table 93, the floor man sets the slips in the rotary table 93 to grasp the pipe below the joint 140. The floor man now sets an arm of the conventional Wilson tongs, not shown, to grasp the stand of pipe just above the joint 140 to hold it against rotation. The driller now actuates the draw works to rotate the rotary table 93 and with it the pipe still in the well, with the result that the pipe in the well is unthreaded at the joint 140 from the stand which extends above the derrick floor.

The floor man then takes the bottom of this stand of pipe and walks with it to some point below the pipe rack 118, whereupon the driller lowers the stand to the floor. The derrick man now swings the centering tool 60 to the position shown in dotted lines at Fig. 11, which position is substantially coincidental with the vertical center line of the derrick. The derrick man now moves the handle 58 to close the finger 79 around the stand of pipe near the top thereof. The driller now closes the switch 116 to rotate the pipe spinner 1 so as to unthread the elevator pin 17 from the top joint of the stand.

When this is accomplished the spring or retracting means in the hook 128 jerks the elevator 1 upwardly, so as to pull the pin 17 above and out of contact with the stand. The derrick man rotates the swinging arm 66 of the centering tool 60 to the position shown in full lines in Fig. 11, and then releases the finger 79 from contact with the stand of pipe, so that he may manually place the top of the stand in the rack 118. This completes the cycle of steps in positioning a stand of flush joint pipe out of the well and into the rack, and at this point the driller is now ready to actuate the draw works 123 to lower the spinning elevator 1 to engage the next stand of pipe, the top joint 140 of which extends from the well and just above the rotary table 93.

*"Coming out" of a well with conventionally jointed pipe*

In "coming out" of a well with conventionally jointed pipe the adapter 90 is used in place of the conventional slips, and when the operation begins conditions are the same as hereinbefore described for "coming out" of a well with flush joint pipe, with the exception that the adapter 90 is in the square 91 of the rotary table bushing 92, and the top joint 140 of the first stand to be taken out of the well rests on the faces of the arms 94 and 95 of the adapter 90.

The sequence of steps is also the same with the exception that after the pin 17 of the spinning elevator 1 has been threaded into the top joint 140, the draw works is actuated to begin raising the stand upwardly, and at this point the floor man unlatches the latch 98 and grasps the handles 105 and 106 to open outwardly the arms of the adapter 90, thereby relieving the contact of the dogs 108 with the stand of pipe.

When the stand has been raised a full stand length, the floor man then closes the arms 94 and 95 and latches them by means of the latch 98, so that the dogs 108 are again brought into grasping contact with the periphery of the next stand of pipe to be raised. The remainder of the operation continues in the same manner as has been described for taking flush jointed pipe out of a well.

It is pointed out that in both the operations of coming out of the well with flush jointed pipe and coming out of the well with conventionally jointed pipe, the operational step by which the joint is broken by conventional Wilson tongs, as hereinbefore described, need not necessarily be followed by the operation of rotating the rotary table 93 to unthread the pipe suspended in the well from the joint from which it has been broken. As an optional substitute for this operation, the driller may actuate the spinning elevator by closing the switch 116 so that the elevator rotates the stand of pipe suspended therefrom in a direction to unthread the pin 121 thereof from the joint 140 of the pipe suspended in the well.

*Use of spinning elevator with modified conventional equipment in going into a well with conventionally jointed pipe*

In this operation, with the equipment shown in Fig. 17 suspended from the C-hook 135, the driller actuates the draw works 123, and, with the handles 176 having been forced outwardly by the floor man to open up the modified elevator 170, the assembly travels upwardly. As the bails 164 pass by the derrickman on the monkey board 61, the derrickman takes the top of a stand of pipe and pushes it outwardly so that the modified elevator 170 slides upwardly around the pipe. As the modified elevator passes the monkey board, the derrickman reaches out and grabs the handles 176 to force them together, whereupon the latch 177 automatically locks the arms 174 together about the pipe. The assembly continues to travel upwardly until the boss 180 of the modified elevator 170 comes into contact with the lower face of the pipe joint 140 at the top of the stand; and then the continued upward travel of the assembly lifts the stand of pipe off the derrick floor.

At this point the driller reverses the direction of travel of the hoisting assembly and lowers the stand of pipe so that the pin 122 at the bottom of the stand may be positioned by the floor man a short distance above the rotary table 93 and centered in the top pipe joint box 121 of the pipe extending from the well, this pipe being supported by slips, not shown, in the rotary table 93. The driller then throws the switch 116 to actuate the pipe spinner 1 to spin a stand of pipe into the top pipe box 121 supported by the slips in the rotary table. This is accomplished since the slips prevent the pipe in the well from rotating, while at the same time the dogs 181 in the modified elevator prevent the suspended stand of pipe from rotating in the modified elevator. The result is that the spinning elevator in rotating rotates the bails 164, the modified elevator 170, and the suspended stand of pipe as a unit, and thus threads the suspended stand of pipe into the box 121.

The driller now actuates the draw works to elevate the whole string of pipe until the lower face of the joint 140 is raised sufficiently above the rotary table to permit the slips to be removed. The driller then actuates the draw works to lower the string of pipe until the top joint 140 is just above the rotary table 93, and then the slips are replaced. The floor man then unlatches the latch 177 of the modified elevator 170 and forces the handles 176 apart to open out the arms 174 of the modified elevator, and then the assembly is ready for upward travel to repeat the cycle.

*Use of spinning elevator with modified conventional equipment in coming out of a well with conventionally jointed pipe*

In this operation, with the equipment shown in Fig. 17 suspended from the C-hook 135, and with the pipe in the well supported by the slips with the top joint 140 extending above the rotary table 93, the assembly is lowered by the driller until the floor man may close and latch the modified elevator 170 just below the lower face of the top joint 140.

The driller then actuates the draw works to raise the pipe until the slips may be taken out by the floor man, and then the pipe is further raised the length of a stand so that a joint of pipe is positioned the required distance above the rotary table 93.

The floor man then resets the slips to grip the pipe and then one arm of a tongs, as a Wilson tongs, is located above the joint 140 and one tong arm is located below this pipe joint so that the joint may be broken by the tongs in the conventional manner. With the joint thus broken, the stand of pipe may be unthreaded from the joint by actuating the draw works to rotate the rotary table 93; or, optionally and preferably, the spinning elevator may be actuated to unthread the pipe 122 from the box 121 of the joint 140.

When this has been accomplished, the floor man takes the lower end of the pipe stand and walks it over to a point just above the derrick floor and beneath the rack 118. This can be done since the bails 164 are loosely confined in the hook arms 162 although the flared portions 168 of these hook arms prevent the bails from excessive twisting in an effort to rotate within the arms, or from crawling upwardly in the arms. When the bottom of the pipe 129 is thus positioned, the assembly is lowered by the driller and the pin 122 at the bottom of the stand rests on the derrick floor. Then the derrick man on the monkey board grasps the top joint 140 of the stand of pipe and releases the modified elevator 170 therefrom, after which the derrick man places the top of the pipe in the rack 118.

It is herein pointed out that whereas the pipe spinner 1 and the auxiliary hoist are described as electrically operated, such need not necessarily be the case, as either may be operated by hydraulic, pneumatic, or any other well known source of power, and either device may be actuated by any well known type of controls.

It is additionally pointed out herein that the new devices disclosed for using the pipe spinner in any of the methods described need not be limited to the specific structures disclosed, but rather this invention primarily contemplates the use of any spinning or rotary means suspendable from the C-hook of a rig as the means for threading a stand of pipe into, or unthreading a stand of pipe out of, the pipe in the well below. Consequently the auxiliary power hoist, releasable clamp, and centering tool may be of any design to accomplish the above described functions of these devices. Also, it is stated that the adapter may also be of any design to accomplish the purpose of gripping pipe in the rotary table against rotation, and of supporting the top pipe joint of the drill string.

It is further asserted that when the pipe spinner is used with modified conventional equipment in handling pipe as hereinabove described, the connection hook, bails, and modified elevator employed need not be limited in form to the structures disclosed, but any connection hook structure may be employed which will non-rotatably suspend bails below the pipe spinner to which the connection hook is engaged; any bails may be employed which may be suspended from a connection hook to non-rotatably support a modified elevator; and any type of modified elevator may be employed which may be readily released from pipe which it grasps against rotation, and which it is adapted to support.

While the term "pipe spinner" has been used as a descriptive term for the apparatus for turning the pipe and for making up and breaking out the threaded pipe connections it seems obvious that other descriptive terms could be used such for instance as the term "power driven swivel," and the invention is to be broadly construed irrespective of the terms used.

Broadly, this invention contemplates a novel combination in drilling rig equipment and the method of using this equipment in such a manner that these elements taken together comprise a "team" or system of correlated elements, which can be used to eliminate one of the two floor men now required on a rig; which can eliminate the conventional elevators now used to elevate conventionally jointed pipe from a well; which can be used to eliminate the lift-plugs now used to elevate flush joint pipe from a well; which completely eliminates the dangerous spinning chain operation now employed in "going into" a well with pipe; and, most important of all, this invention greatly accelerates the speed with which pipe can be put into or taken out of a well.

This invention also broadly contemplates the provision of a pipe spinner adapted for connection, via a connection hook and bails, to a modified structure of the conventional pipe elevators used in handling conventionally jointed pipe, and with this equipment the speed of "going into" and "coming out of" a well with pipe can be greatly accelerated while at the same time the dangerous spinning chain operation is eliminated.

What is claimed is:

1. With a well drilling rig including, an extendable stop means, a source of power, a rotary table adapted to support the well pipe for vertical movement, to rotate the pipe, and to release the pipe, a derrick having a crown block, a drawworks to rotate said table, a cable actuated by said drawworks, a travelling block movably supported from said crown block by said cable and movable vertically thereby upon actuation of said drawworks, said travelling block having bails suspended therefrom terminating downwardly in ring elements, the combination of, a pipe spinner including, a housing, ears on said housing insertable in said bail rings so that said spinner may be supported for suspension from said bails, a power drive mounted in said housing and connected to said source of power, a first shaft extending from the bottom of said housing and having a hub thereon adapted to rotatably shoulder in said housing, a lost motion coupling rotatably supported on said hub and adapted, after relative rotation with relation thereto, to rotate therewith, a second shaft extending below and from said power drive and having a flange thereon, a friction clutch extending around said second shaft to bear upon said coupling, and resilient means between said flange and said clutch to force said clutch to rotate said coupling and said first shaft upon rotation of said second shaft by said source of power, said first shaft having threaded pin means on the lower end thereof to be threaded into and out of the well pipe to be moved vertically, said housing having opposed ring members thereon to be engaged by said stop means to prevent counter-rotation of said spinner housing as said rotary table rotates said well pipe.

2. A pipe spinner adapted for connection to be suspended from the rings of bails supported by the travelling block of a well drilling rig having extendable stop means thereon and having a source of power thereon and including a rotary table adapted to support the well pipe, and to release the pipe, said spinner including, a housing, ears on said housing insertable in said bail rings so that said spinner may be supported for suspension from said bails, a power drive mounted in said housing and connected to said source of power, a first shaft extending from the bottom of said housing and having a hub thereon adapted to rotatably shoulder in said housing, a lost motion coupling rotatably supported on said hub and adapted, after relative rotation with relation thereto, to rotate therewith, a second shaft extending below and from said power drive and having a flange thereon, a friction clutch extending around said second shaft to bear upon said coupling, and resilient means between said flange and said clutch to force said clutch to rotate said coupling and said first shaft upon rotation of said second shaft by said source of power, said first shaft having threaded pin means on the lower end thereof to be threaded into and out of the well pipe to be moved vertically, said housing having opposed ring members thereon to be engaged by said stop means to prevent counter-rotation of said spinner housing as said rotary table rotates said well pipe.

3. A pipe spinner adapted for connection to be suspended from the rings of bails supported by the traveling block of a well drilling rig having extendable stop means thereon and having a source of power thereon, said spinner including, a housing, means on the housing engageable with said bail rings to support the housing from said bails, a power drive mounted in said housing and connected to said source of power, a first shaft extending from the bottom of said housing, a first clutch element rotatably supported on said shaft, interengageable means on said element and said shaft to cause said element to rotate with said shaft after limited rotation relative thereto, a driving shaft extending below and connected to said power drive to be rotated thereby, a second clutch element extending around said second shaft and movable longitudinally thereof into and out of clutching engagement with said first clutch element, said second shaft having an external flange thereon, and resilient means positioned to coact with said flange and said second clutch element to yieldingly urge said second clutch element into clutching engagement with said first clutch element to cause said first clutch element to rotate said first shaft upon rotation of said second shaft by said power drive, threadable means on said first shaft rotatable therewith and threadably engageable with a well pipe to connect the pipe with and disconnect the pipe from said first shaft by rotation of said first shaft, and means on the housing engageable with said stop means to hold the housing against rotation with said shafts.

LYNN W. STORM.

REFERENCES CITED

The following references are of record in the file of this patent:

UNITED STATES PATENTS

| Number | Name | Date |
| --- | --- | --- |
| 294,672 | Proctor et al. | Mar. 4, 1884 |
| 499,962 | Budd | June 20, 1893 |

(Other references on following page)

UNITED STATES PATENTS

| Number | Name | Date |
|---|---|---|
| 823,238 | Clark | Oct. 2, 1906 |
| 1,163,213 | Chapman | Dec. 7, 1915 |
| 1,377,575 | Greve | May 10, 1921 |
| 1,460,320 | Frey | June 26, 1923 |
| 1,511,837 | Nebergall | Oct. 14, 1924 |
| 1,536,617 | Montgomery | May 5, 1925 |
| 1,796,981 | Creighton | Mar. 17, 1931 |
| 1,825,018 | Smith | Sept. 29, 1931 |
| 1,842,638 | Wigle | Jan. 26, 1932 |
| 1,891,832 | Parks | Dec. 20, 1932 |
| 1,936,884 | Ruesenberg | Nov. 24, 1933 |
| 2,000,221 | Dawson | May 7, 1935 |
| 2,056,206 | Peacock | Oct. 6, 1936 |
| 2,091,225 | Eaton | Aug. 24, 1937 |
| 2,092,511 | Henry | Sept. 7, 1937 |
| 2,162,653 | Umphres | June 13, 1939 |
| 2,168,837 | York | Aug. 8, 1939 |
| 2,188,941 | Eden | Feb. 6, 1940 |
| 2,190,547 | Le Bus | Feb. 13, 1940 |
| 2,226,947 | Sheldon | Dec. 31, 1940 |
| 2,250,836 | Landers | July 29, 1941 |
| 2,290,247 | Perkins | July 21, 1942 |
| 2,313,243 | Johnson | Mar. 9, 1943 |
| 2,412,627 | McGowan | Dec. 17, 1946 |
| 2,446,363 | Daum | Aug. 3, 1948 |
| 2,450,934 | Calhoun | Oct. 12, 1948 |
| 2,488,107 | Abegg | Nov. 15, 1949 |